Aug. 25, 1931. H. R. DAVIES 1,820,530
AIR CLEANER
Original Filed May 29, 1919
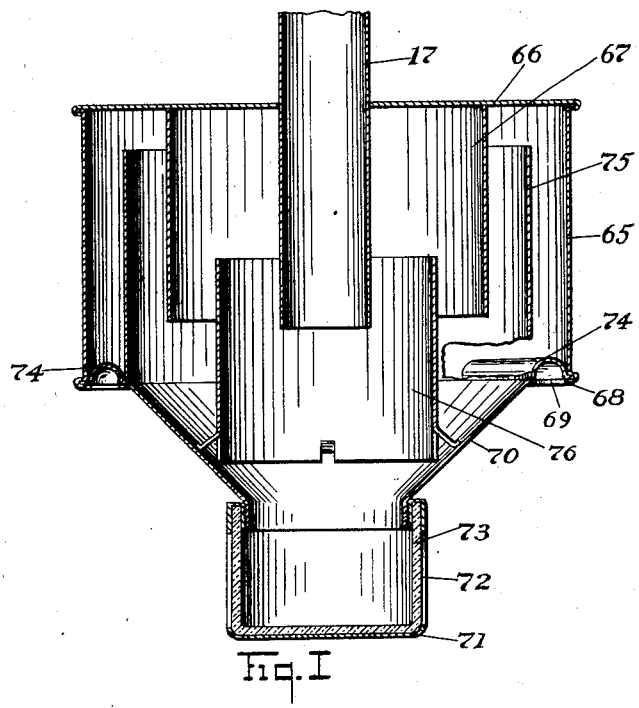
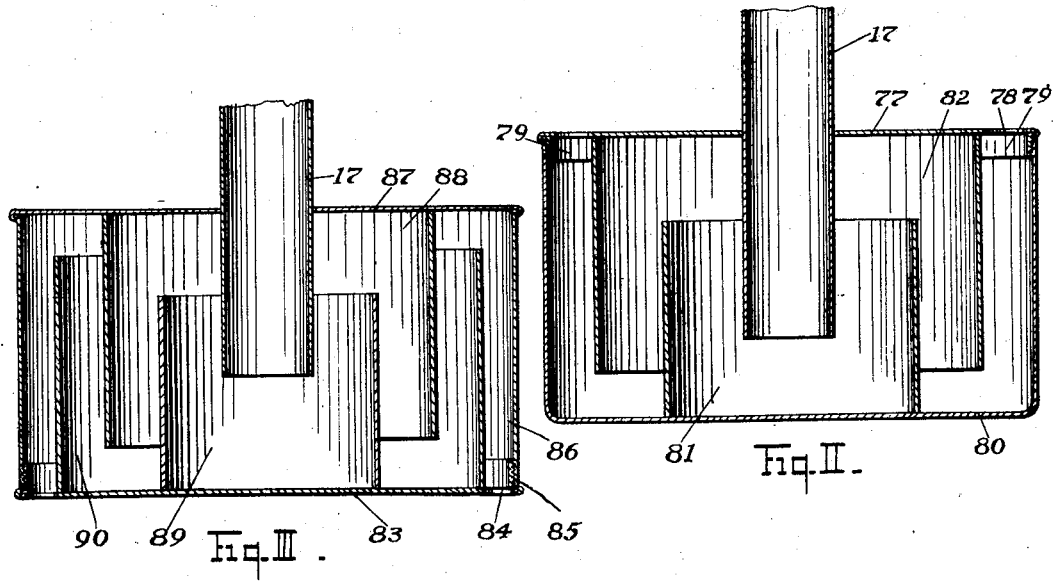
INVENTOR.
Henry R. Davies
BY Braselton, Whitcomb Davies
ATTORNEYS Patented Aug. 25, 1931

1,820,530

UNITED STATES PATENT OFFICE

HENRY R. DAVIES, OF VALLEY COTTAGE, NEW YORK, ASSIGNOR, BY MESNE ASSIGNMENTS, TO THE TILLOTSON MANUFACTURING COMPANY, OF TOLEDO, OHIO, A CORPORATION OF DELAWARE

AIR CLEANER

Original application filed May 29, 1919, Serial No. 300,617. Divided and this application filed March 6, 1929. Serial No. 344,873.

This invention relates to improvements in air cleaners for removing dust and other foreign matter from the air about to enter the air intake of an internal combustion engine, and is a division of my copending application, Serial Number 300,617, filed May 29, 1919, which has matured into Patent No. 1,708,122, granted April 9, 1929.

One of the objects of the invention is the provision of a cleaner of this character which shall accomplish the cleaning operation without the use of a sieve or dust type cloth either of which when it becomes dirty chokes the air inlet and hence requires attention at frequent intervals.

A further object is the provision of a dust receptacle in which the dust and foreign particles are deposited, said receptacle being arranged to permit ready removal for cleaning purposes.

Other objects, and objects relating to details of construction and economies of manufacture, will appear as I proceed with the description of those embodiments of the invention, which, for the purposes of the present application, I have illustrated in the accompanying drawings, in which:

Figure 1 is a vertical sectional view showing one form of my invention.

Figure 2 is a vertical sectional view showing another form of my invention.

Figure 3 is a view similar to Figure 2 showing still another form of the invention.

Referring to the drawings in detail, and particularly Figure 1, the cleaner consists of a cylindrical side section 65, and closed top 66 carrying a depending cylindrical baffle 67. Through the center of the top 66, the air exit pipe 17 extends well down into the casing, its outer end (not shown) being adapted to be connected to the air intake of a carburetion device for an internal combustion engine. The bottom consists of a flat horizontal rim 68 through which the air inlet perforations 69 are punched, and an integral downwardly and inwardly sloping portion 70 to the lower end of which is threaded the dust cup. I have illustrated the cup as built of a metal frame 71 in the sides of which are openings 72 exposing to view the contents of the cup through a glass insert 73. Small inverted troughs 74 are mounted upon the upper surface of the rim 68 with their closed ends above the perforations 69 in order to produce a circular motion of the incoming air. Just inside these troughs a cylindrical baffle 75 is carried by the bottom of the casing. Another cylindrical baffle 76 is carried by the sloping part 70 of the bottom, but separated therefrom so as to leave a narrow annular space through which dust may pass to the dust cup. Entering air moves in a spiral course up between the casing 65 and baffle 75, then downwardly between baffle 75 and 67, upwardly again between baffle 67 and 76, downwardly between baffle 76 and pipe 17, and finally upwardly through the latter pipe. During this travel it loses its dust content through surface friction with the baffle walls, and also partially through centrifugal force in making the turns from upward to a downward course and vice versa.

In the form of my invention shown in Figure 2, the top 77 contains air inlet openings 78, and carries at its periphery a depending externally threaded ring 79, upon which is removably threaded the balance of the casing which consists of an integral cup shaped bottom and side wall element 80. Inner and outer cylindrical baffles 81 and 82 are carried by the bottom 80 and top 77 respectively.

In the form of my invention shown in Figure 3, the bottom 83 contains the air inlet holes 84, and carries a threaded ring 85, by means of which the bottom is removably supported. The side wall 86 is cylindrical and is secured at its upper edge to the flat top 87. A cylindrical baffle 88 depends from the top 87, while two cylindrical baffles 89 and 90 are mounted upon the bottom 83.

In operation, the modifications illustrated in Figures 2 and 3 are substantially the same as in Figure 1. It should be noted that in the forms of my invention illustrated, the height of the baffles decreases toward the center, and that the distance between the baffles increases toward the center. This is for the purpose of compensating for the smaller circular dimensions of the air passages toward the center so as to approximate uniformity in the total cross sectional area of the passages as they approach the center, hence providing for a substantially equal speed of motion of the air in all parts of the device up to the time when it enters the outlet pipe.

I am aware that the particular embodiments of my invention above described, and illustrated in the accompanying drawings, are susceptible of considerable variation without departing from the spirit thereof, and therefore I desire to claim my invention broadly as well as specifically, as indicated by the appended claims.

I claim as my invention:

1. In an air cleaner, the combination of a casing having an air inlet and an air outlet; a plurality of substantially annular baffle plates in said casing, said baffles being so arranged that the cross sectional areas of the annular chambers formed by said baffle plates are substantially uniform.

2. In an air cleaner, the combination of a casing having end closures, said casing having a peripheral air inlet and an axially arranged air outlet; a plurality of annular baffle plates positioned in said casing, said baffles being so arranged that the velocity of the air remains substantially unchanged in passing through said cleaner.

3. In an air cleaner, the combination of a casing, one end of said casing having a peripheral air inlet and a centrally arranged air outlet; a plurality of baffle plates in said casing for alternately changing the direction of the movement of air therethrough, said baffle plates being so arranged that the cross sectional areas of the annular chambers formed by said baffle plates are substantially uniform.

In testimony whereof, I affix my signature.

HENRY R. DAVIES.